US012280481B2

(12) United States Patent
Reckhart

(10) Patent No.: US 12,280,481 B2
(45) Date of Patent: Apr. 22, 2025

(54) TORQUE GRIP SLIP FORCE PLIERS

(71) Applicant: Channellock, Inc., Wilmington, DE (US)

(72) Inventor: Harry E. Reckhart, Stoneboro, PA (US)

(73) Assignee: Channellock, Inc., Wilmington, DE (US)

( * ) Notice: Subject to any disclaimer, the term of this patent is extended or adjusted under 35 U.S.C. 154(b) by 407 days.

(21) Appl. No.: 14/850,242

(22) Filed: Sep. 10, 2015

(65) Prior Publication Data

US 2015/0375371 A1 Dec. 31, 2015

Related U.S. Application Data

(63) Continuation-in-part of application No. 14/156,511, filed on Jan. 16, 2014, now abandoned.

(51) Int. Cl.

| | |
|---|---|
| ***B25B 7/02*** | (2006.01) |
| ***B25B 7/10*** | (2006.01) |
| ***B25B 13/50*** | (2006.01) |

(52) U.S. Cl.

CPC .................. *B25B 7/02* (2013.01); *B25B 7/10* (2013.01); *B25B 13/5016* (2013.01)

(58) Field of Classification Search

CPC .............................. B25B 7/02; B25B 13/5016

USPC .................... 81/411, 414, 418, 186; 269/257

See application file for complete search history.

(56) References Cited

U.S. PATENT DOCUMENTS

| | | | | |
|---|---|---|---|---|
| 3,188,894 | A * | 6/1965 | Matsuoka | B25B 7/02 81/186 |
| 3,247,742 | A * | 4/1966 | Woodbury | B25B 7/02 81/3.4 |
| 3,272,038 | A * | 9/1966 | Burstall | E21B 19/161 279/123 |
| 3,760,473 | A * | 9/1973 | Studdard | B23D 71/04 7/125 |
| 4,890,519 | A | 1/1990 | Le Duc | |
| 5,134,908 | A * | 8/1992 | Fisher | B25B 7/10 81/414 |
| 5,176,049 | A | 1/1993 | Neff | |
| 6,393,951 | B1 * | 5/2002 | Jansson | B25B 13/5025 81/186 |

(Continued)

OTHER PUBLICATIONS

Internet search for “slip joint pliers” on HomeDepot.com, https://www.homedepot.com/b/Tools-Hand-Tools-Pliers-Slip-Joint-Pliers (Year: 2022).*

(Continued)

*Primary Examiner* — Bryan R Muller

(74) *Attorney, Agent, or Firm* — Andrew F. Young, Esq.; NOLTE LACKENBACH SIEGEL

(57) ABSTRACT

A slip-joint pliers having opposed parallel jaws with a specific cross-hatch pyramidal teeth construction develops a high torque grip slip force on a seized or overly tightened cylindrical workpiece such as a pipe or bar. The pliers includes a tongue in groove type slip-joint construction. The cross-hatch teeth are disposed at between 110° and 150°, and the rows of cross-hatch teeth are spaced at less than about 10 teeth/inch on each jaw face. The pliers are a compact yet heavy-duty use tool that develops a torque grip slip force greater than similarly sized prior art pliers.

2 Claims, 13 Drawing Sheets

(56) References Cited

U.S. PATENT DOCUMENTS

| | | | | |
|---|---|---|---|---|
| 6,971,283 | B2 * | 12/2005 | Belik | E21B 19/161<br>81/57.33 |
| 7,395,740 | B2 | 7/2008 | Reckhart | |
| 7,415,913 | B2 | 8/2008 | Reckhart | |
| 8,978,226 | B2 * | 3/2015 | Kady | B25B 5/068<br>7/125 |
| 2002/0121162 | A1 | 9/2002 | Dong | |
| 2009/0133540 | A1 | 5/2009 | Yu | |

OTHER PUBLICATIONS

Internet search for “slip joint pliers” on HomeDepot.com, https://www.homedepot.com/Tools-Hand-Tools-Pliers-Slip-Join-Pliers (Year: 2022).*

* cited by examiner

FIG.17
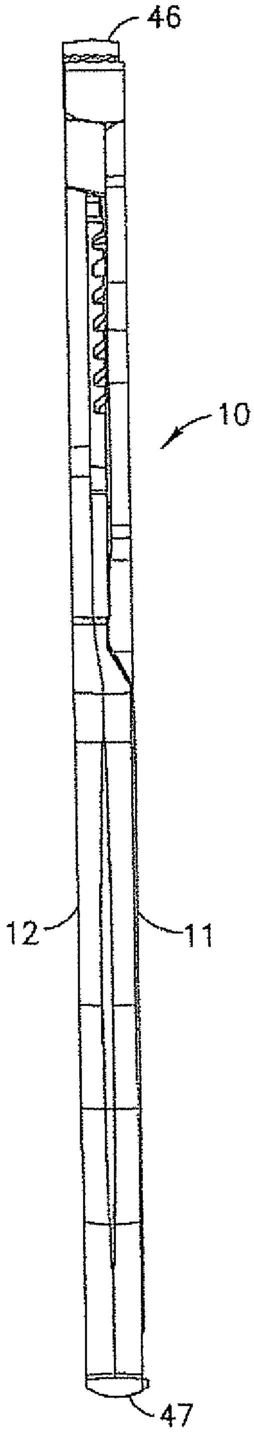
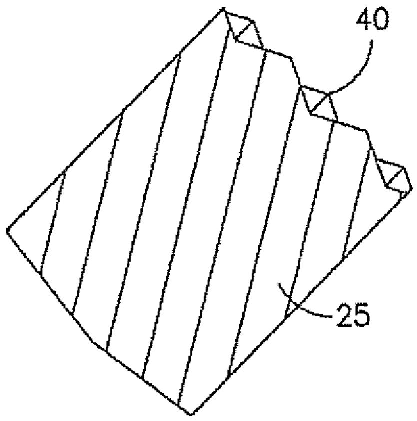
FIG.16
FIG.18
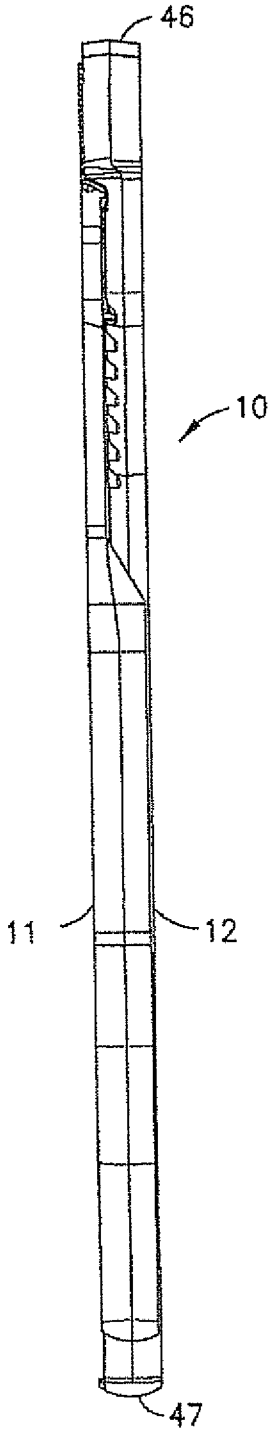

TORQUE GRIP SLIP FORCE PLIERS

PRIOR RELATED APPLICATIONS

This application is a continuation-in-part of Ser. No. 14/156,511, filed Jan. 16, 2014, which application is incorporated herein in its entirety by reference thereto.

BACKGROUND OF THE INVENTION

1. Field of the Invention

This invention relates to pliers. Specifically this invention relates to pliers useful in heavy-duty operations.

2. Background and Discussion of the Prior Art

In the art related to pliers particularly for gripping pipes and like plumbing fixtures, it was known to provide slip joint adjustable jaws in parallel disposition such as is disclosed in U.S. Pat. No. 4,890,519, granted Jan. 2, 1990 to Le Duc; and U.S. Pat. No. 5,176,049, granted Jan. 5, 1993 to Neff. These parallel facing jaws generally did not provide sufficient grip to hold and rotate seized or tightened cylindrical workpieces such as pipes and bars. Such tools, when engaging a seized or tightened cylindrical pipe or bar, would readily slip when a large torque force was exerted tangentially to the pipe or bar axis. The heavy-duty tool art desires pliers with greater non-slip gripping forces than heretofore. More recent pliers and pipe wrenches provide V-shaped, curved or arcuately opposed jaw faces that encompass the cylindrical pipe or bar, such as is disclosed in US2009/0133540, published May 28, 2009 to Yu, and US 2002/0121162 published Sep. 5, 2002 to Dong, in an attempt to provide sufficient torque grip slip forces. Such prior art pliers and wrenches were not of practical design and costly to manufacture, and the jaws having curvatures or V-shaped angular constructions did not operably fit differently sized pipes and bars.

The heavy-duty tool art desires a pliers that has high torque grip capability without slippage on differently sized seized or overly tightened cylindrical workpieces, such as pipes or bars, and is of non-complex design and construction, is readily manufactured, and yet safe and practical use. The present invention provides a solution to these heavy-duty pliers art needs.

SUMMARY OF THE INVENTION

The invention, in one aspect, is a slip-joint pliers having opposed parallel jaws with a specific cross-hatch pyramidal teeth construction. The pliers develops a high torque grip slip force on a seized or overly tightened cylindrical workpiece such as a pipe or bar. The pliers in one embodiment includes a tongue in groove type slip-joint construction. The pliers in one further aspect provides that when a 45 lb force is exerted on the handles through a 5 to 6 inch moment arm on a ¾ inch cylindrical workplace, a 200 to 300 lb. torque is developed without slippage of the jaws on the cylindrical workpiece. The cross-teeth or cross-hatch teeth are disposed at between 110° and 150°, and preferably at about 130°. The rows of cross-hatch teeth are spaced at less than about 10 teeth/inch on each jaw face. The pliers is relatively compact being no greater than about 10 to 12 inches in length with a moment arm of no more than about 5 to 6 inches. The afore-described pliers is a compact yet heavy-duty use tool, that develops a torque grip slip force greater than similarly sized prior art pliers.

The invention, in another aspect, is a method for unloosening a seized or overly tightened workpiece, which includes the steps of (a) providing a pliers having a first member having a proximately disposed handle and a distally disposed jaw having a face; and a second member having a proximately disposed handle and a distally disposed jaw having a face, and having a slot disposed in one of the handles, with a pivot pin slidably operably disposed in the slot with the jaw faces in parallel operable disposition; and each jaw face has first and second pluralities of pyramidal teeth in angular disposition, and (b) grippingly engaging the workpiece with the pliers jaws, and then (c) moving the pliers to unloosen the seized or overly tightened workpiece.

BRIEF DESCRIPTION OF THE DRAWINGS

FIG. 16 is a sectional view taken along line 16-16 of FIG. 12;

FIG. 17 is a side view of the pliers of FIG. 1;

FIG. 18 is a side view of the pliers of FIG. 1;

DESCRIPTION OF THE INVENTION

Figure 1:
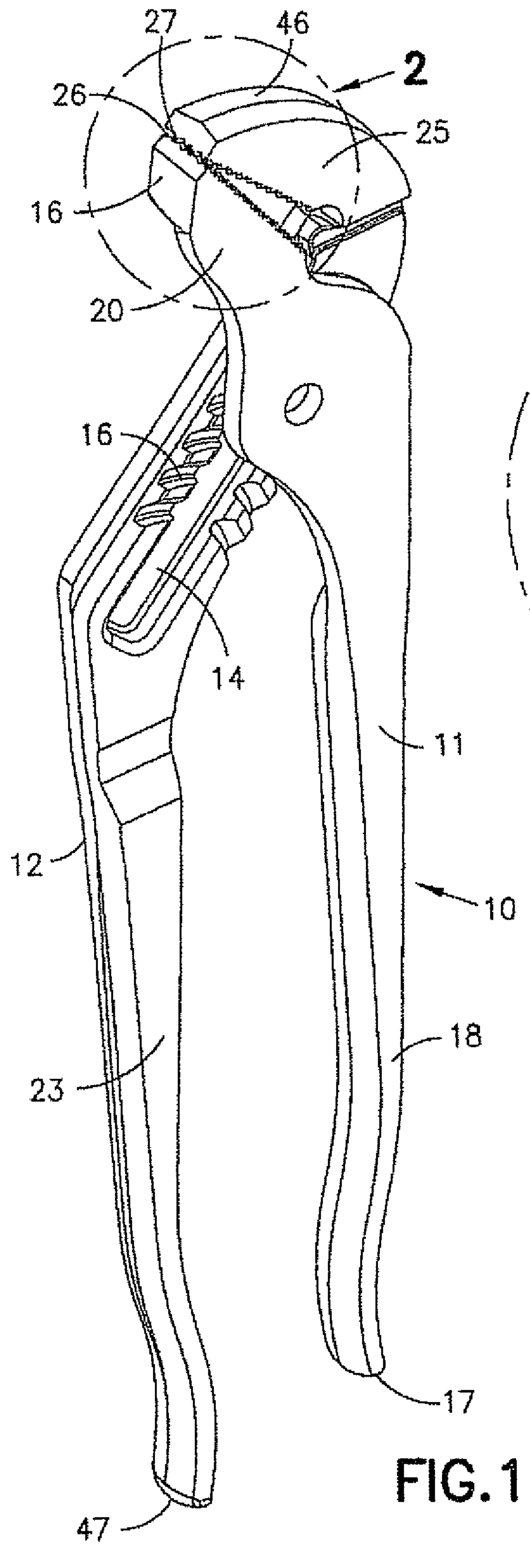
FIG. 1 is a front perspective view of the pliers in the fully closed position.
Figure 2:
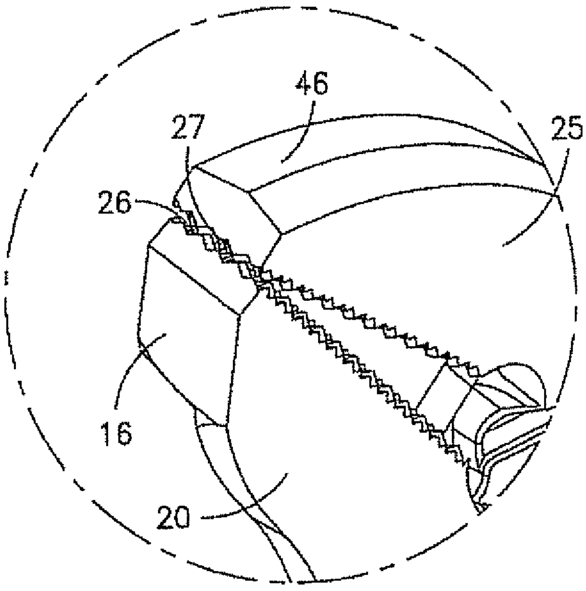
FIG. 2 is an enlarged view of the jaws as shown in FIG. 1.
Figure 3:
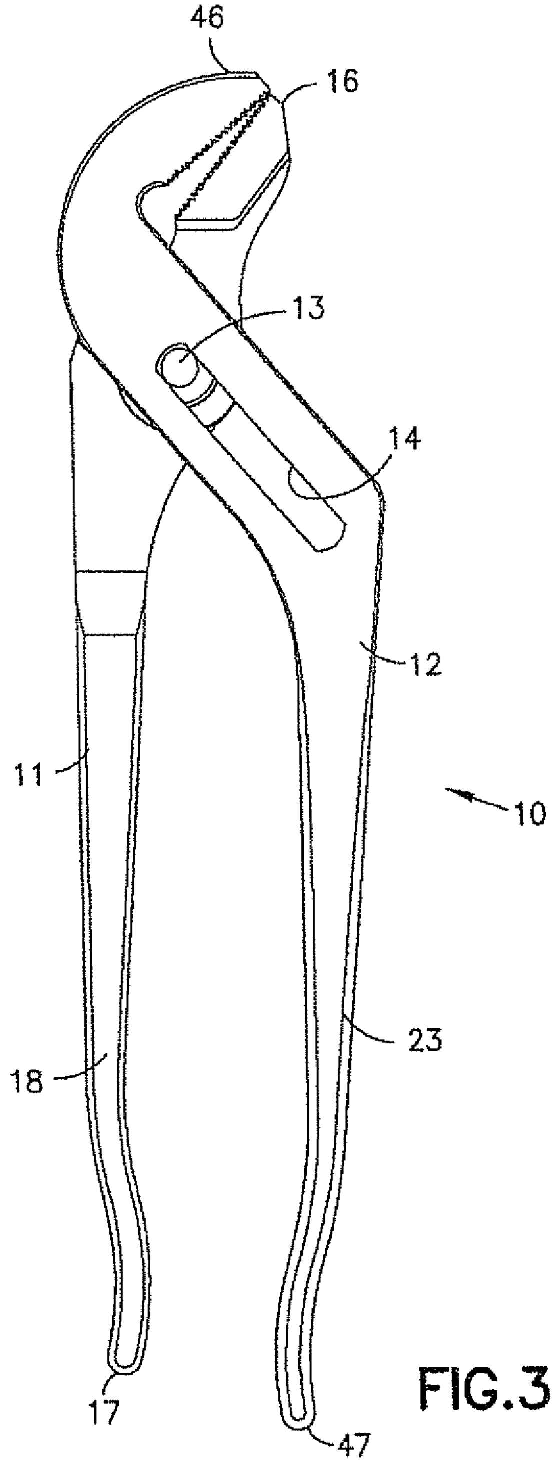
FIG. 3 is a rear view of the pliers of FIG. 1.
Figure 4:
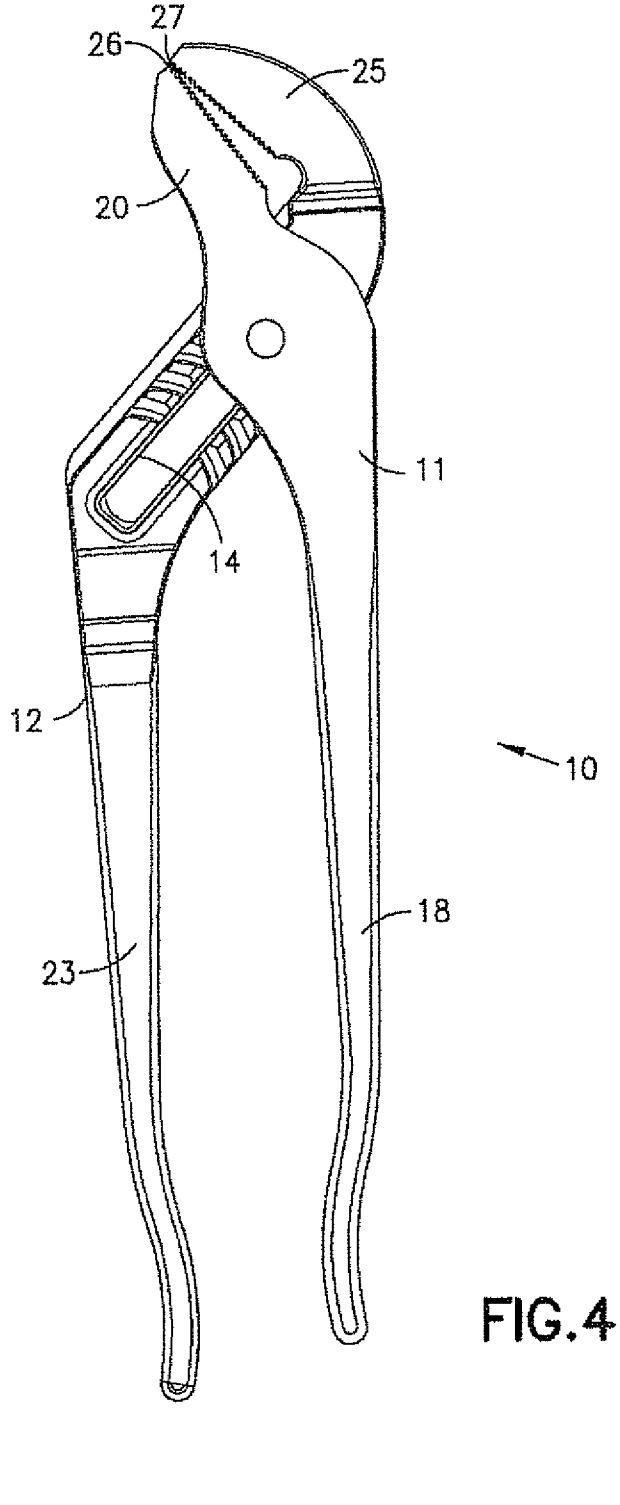
FIG. 4 is a front view of the pliers as shown in FIG. 3.
Figure 5:
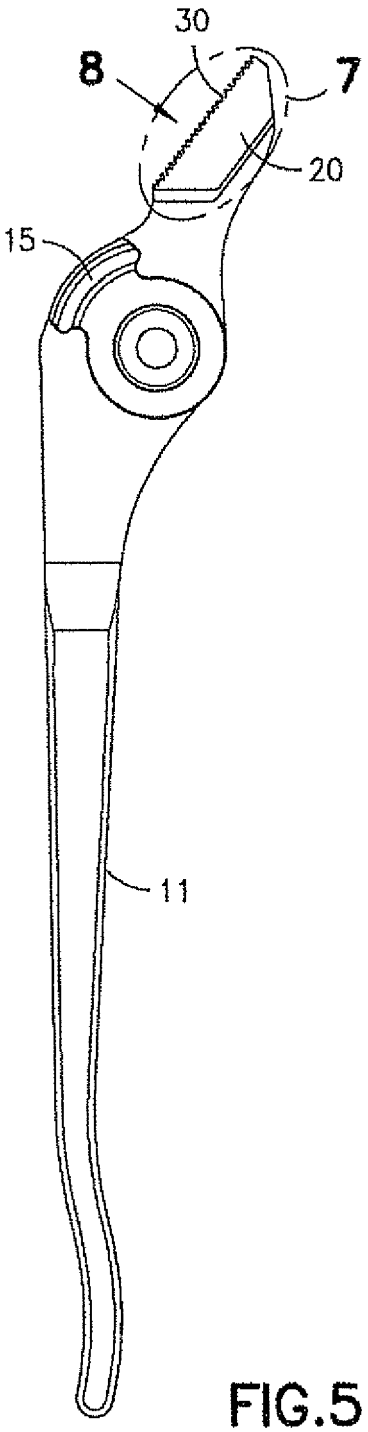
FIG. 5 is an inner view of the front member.
Figure 6:
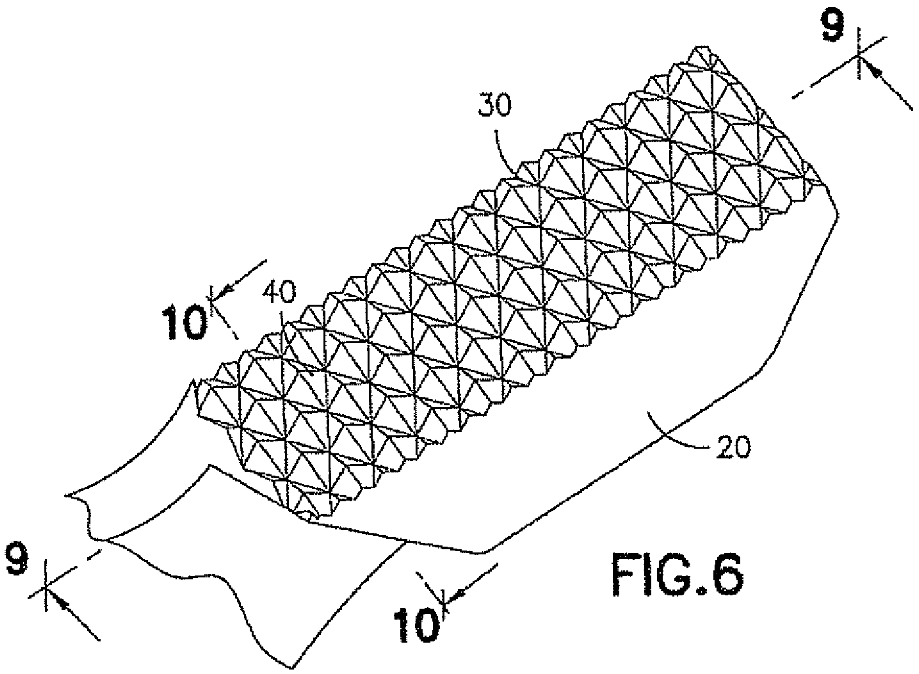
FIG. 6 is a greatly enlarged view of the pyramidal rows of angularly disposed jaw teeth.
Figure 7:
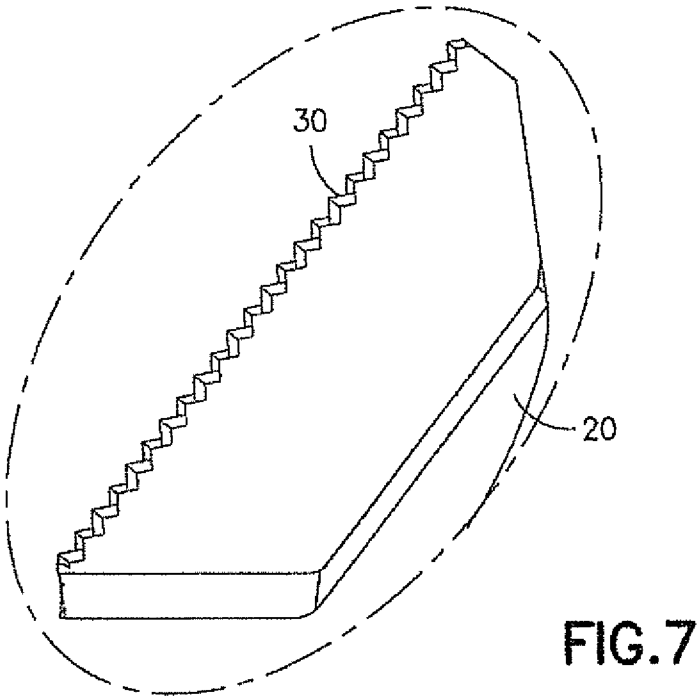
FIG. 7 is an enlarged view from FIG. 5.

The term "torque grip slip force" as used hereinbefore and hereinafter means the maximum torque force that is developed on a cylindrical workpiece without slippage of the pliers jaws grippingly engaged on the cylindrical workpiece.

Referring to the FIGS. there is shown pliers 10 of the present invention. Pliers 10 includes front member 11 and rear member 12. Members 11 and 12 are operably connected by pivot pin 13 slidably disposed in elongate slot 14 with a tongue 15 and groove 16 construction, as is well-known in the pliers art. Member 11 includes distal end 16 and proximate end 17, handle 18 and jaw 20. Member 12 includes distal end 46, proximate end 47, handle 23 and jaw 25.

Figure 8:
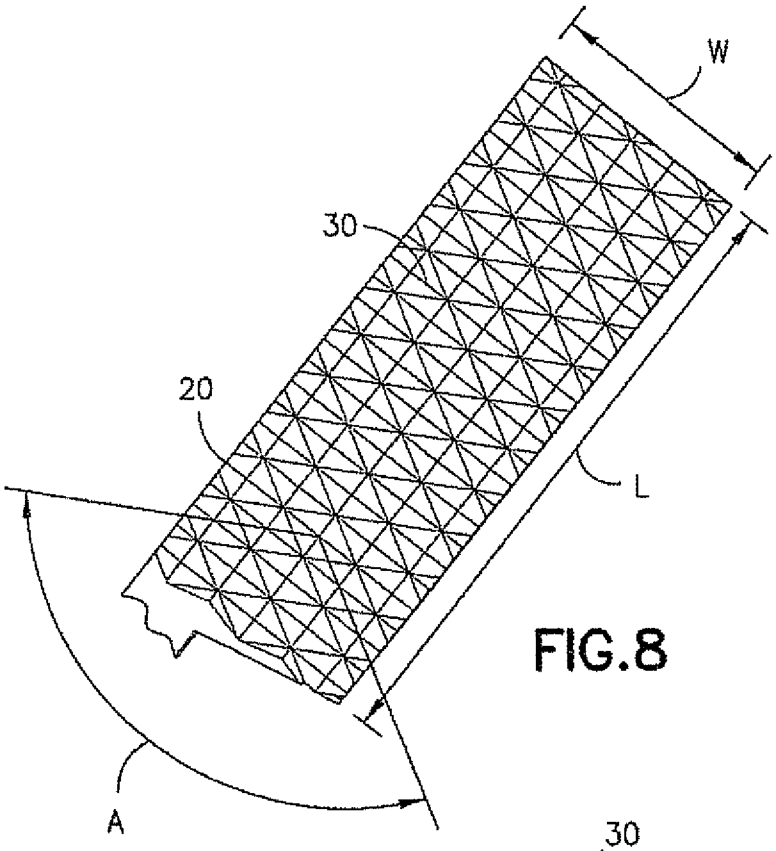
FIG. 8 is a planar view of the rows of angularly disposed jaw teeth.
Figure 9:
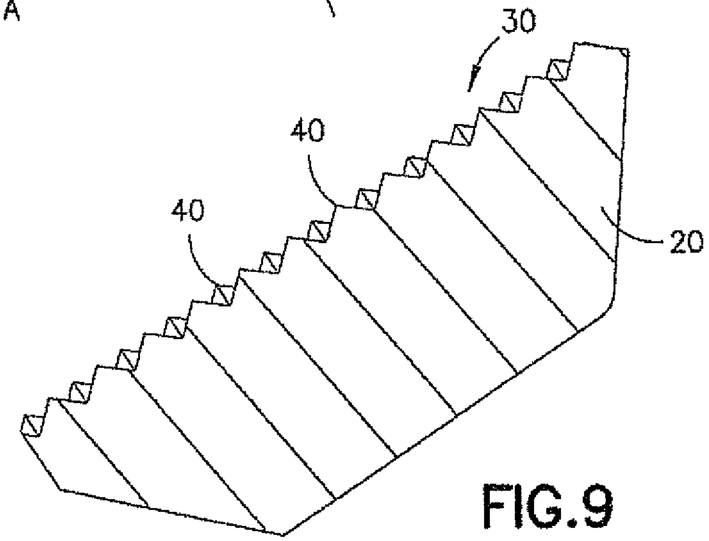
FIG. 9 is a sectional view taken along lines 9-9 of FIG. 6.
Figure 10:
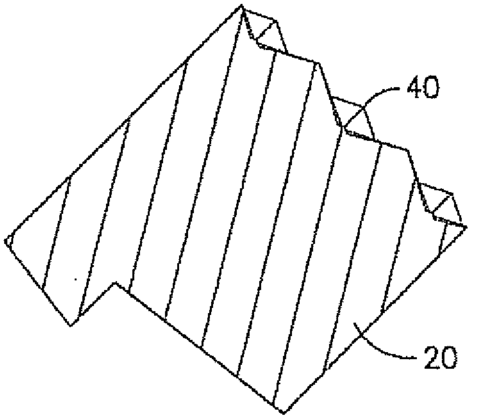
FIG. 10 is a sectional view taken along line 10-10 of FIG. 6.
Figure 11:
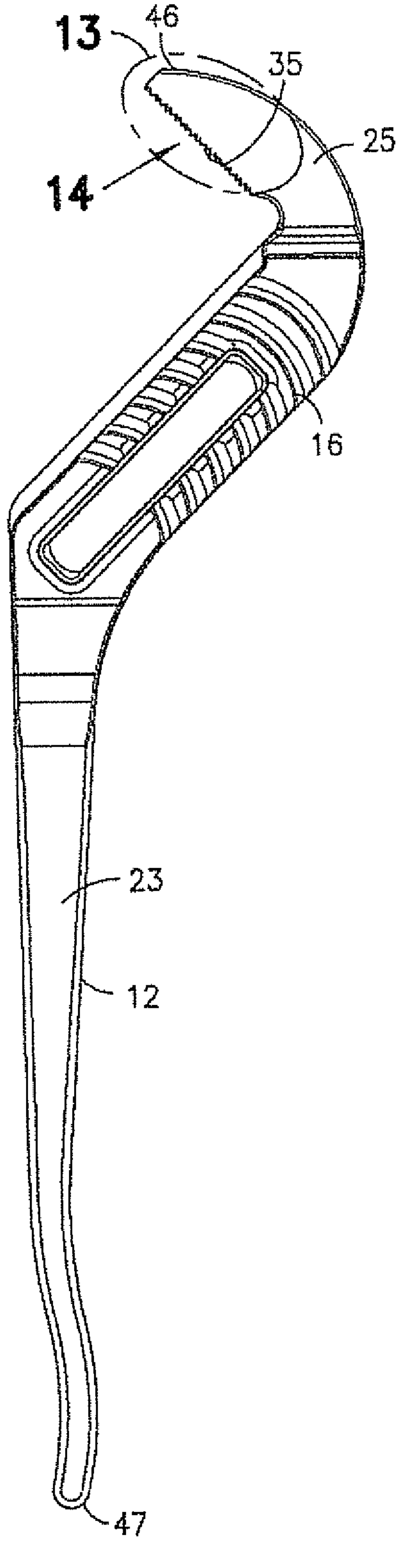
FIG. 11 is an inner view of the rear member.
Figure 12:
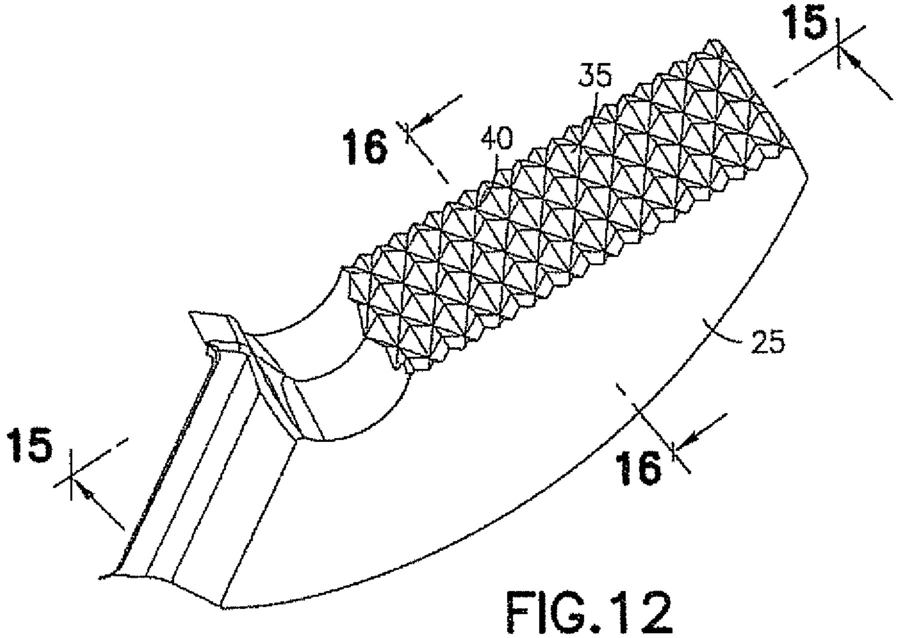
FIG. 12 is a perspective view of jaw.
Figure 13:
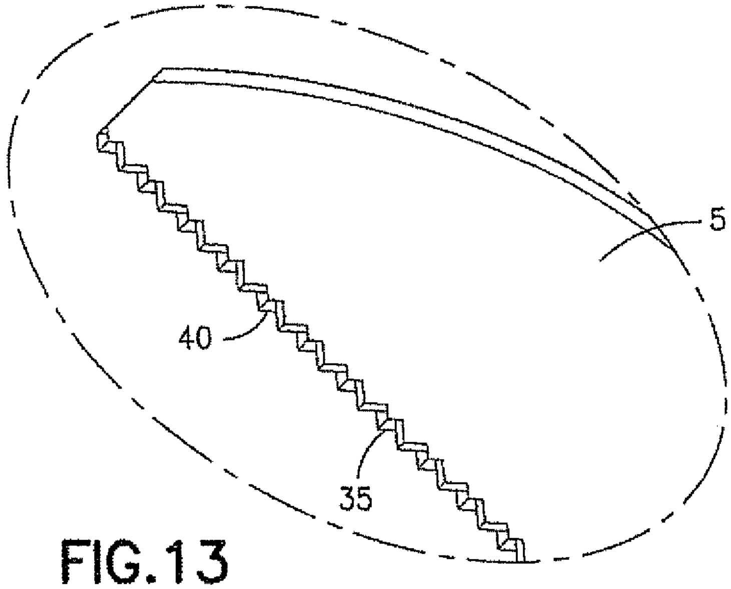
FIG. 13 is an enlarged view taken from FIG. 11.
Figure 14:
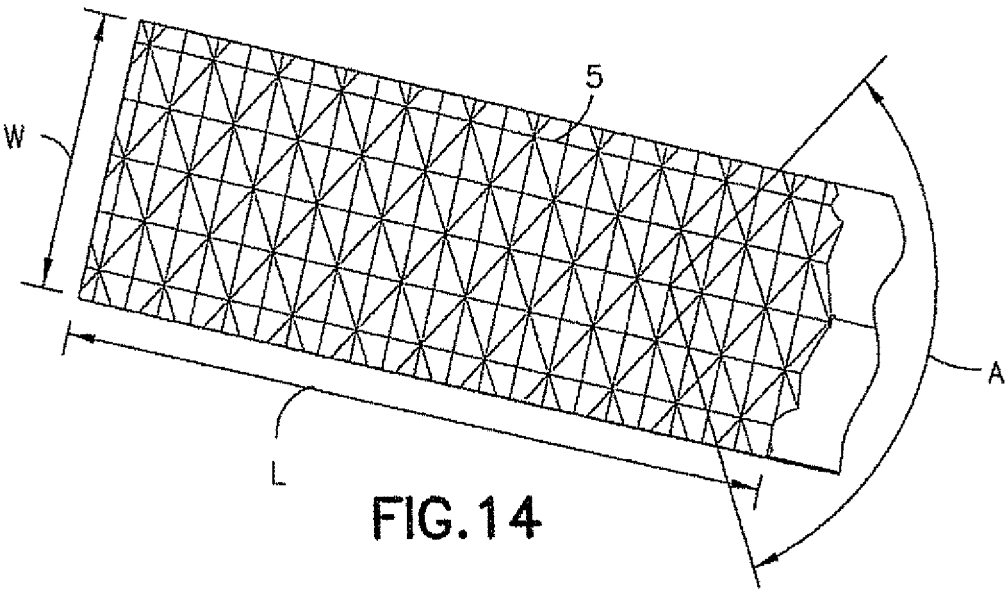
FIG. 14 is a planar view of the jaw teeth
Figure 15:
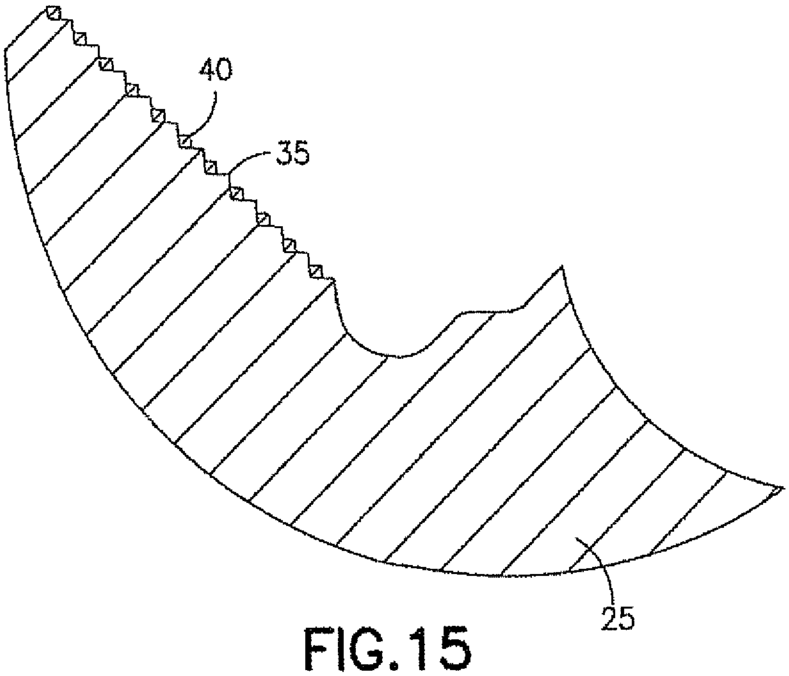
FIG. 15 is a sectional view taken along line 15-15 of FIG. 12.
Figure 19:
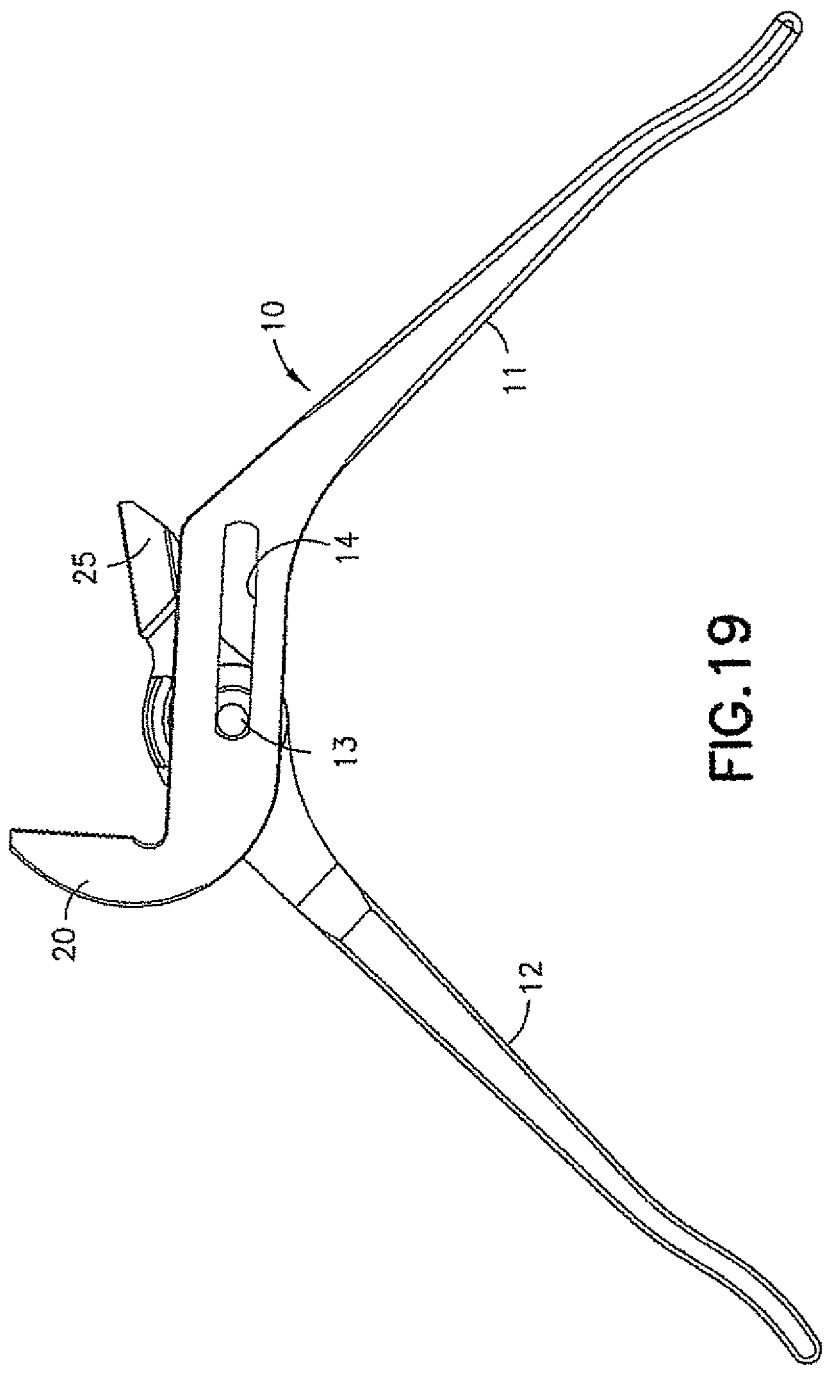
FIG. 19 is a front elevational view of the pliers of FIG. 1 in the fully opened position.
Figure 20:
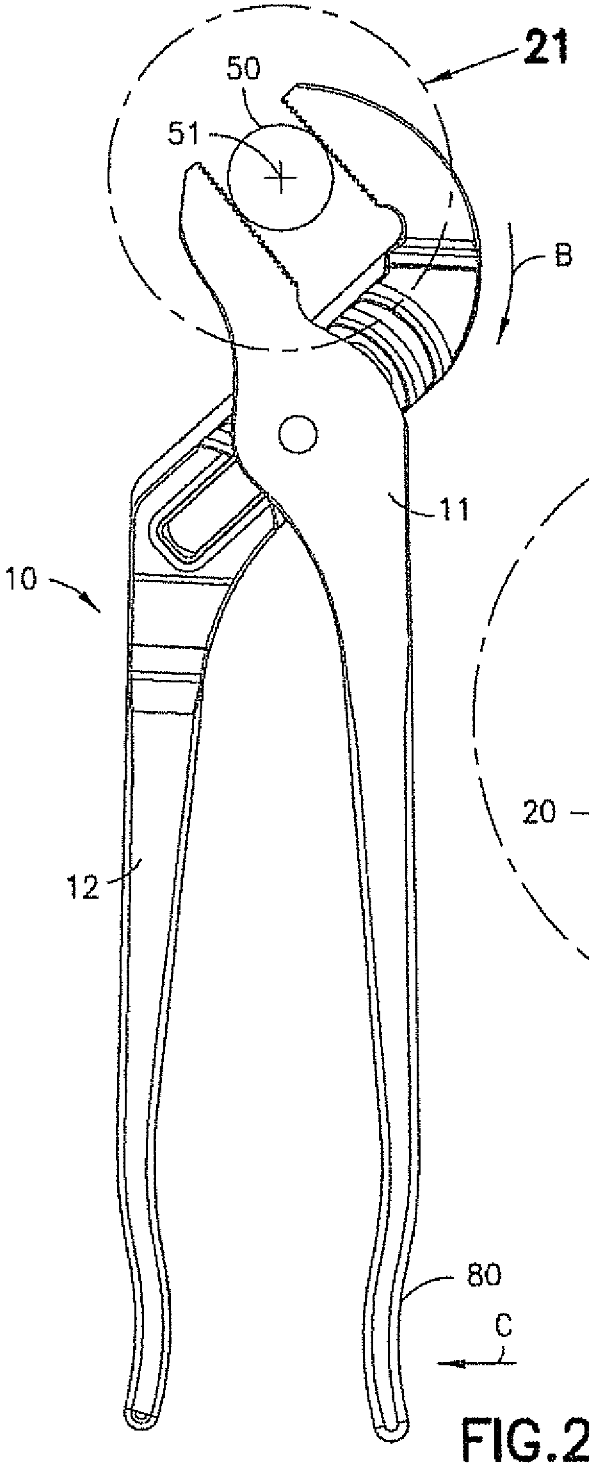
FIG. 20 is a front elevation view of the pliers of FIG. 1 operably grippingly engaged with a cylindrical workpiece.
Figure 21:
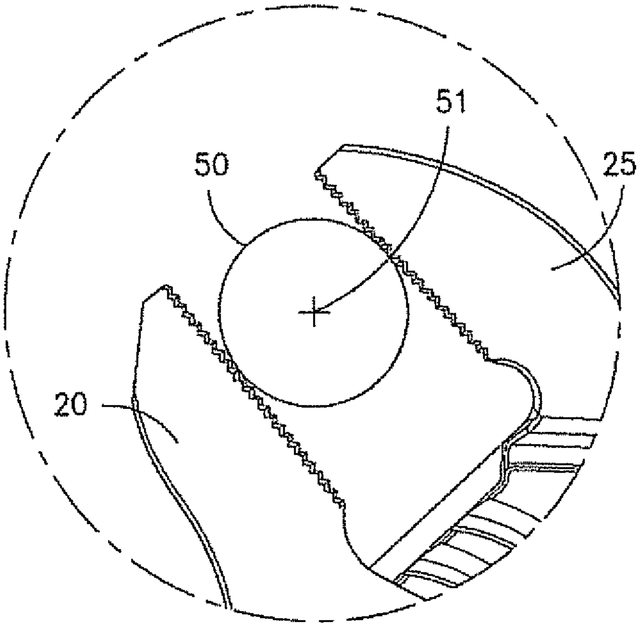
FIG. 21 is an enlarged view taken from FIG. 20.
Figure 22:
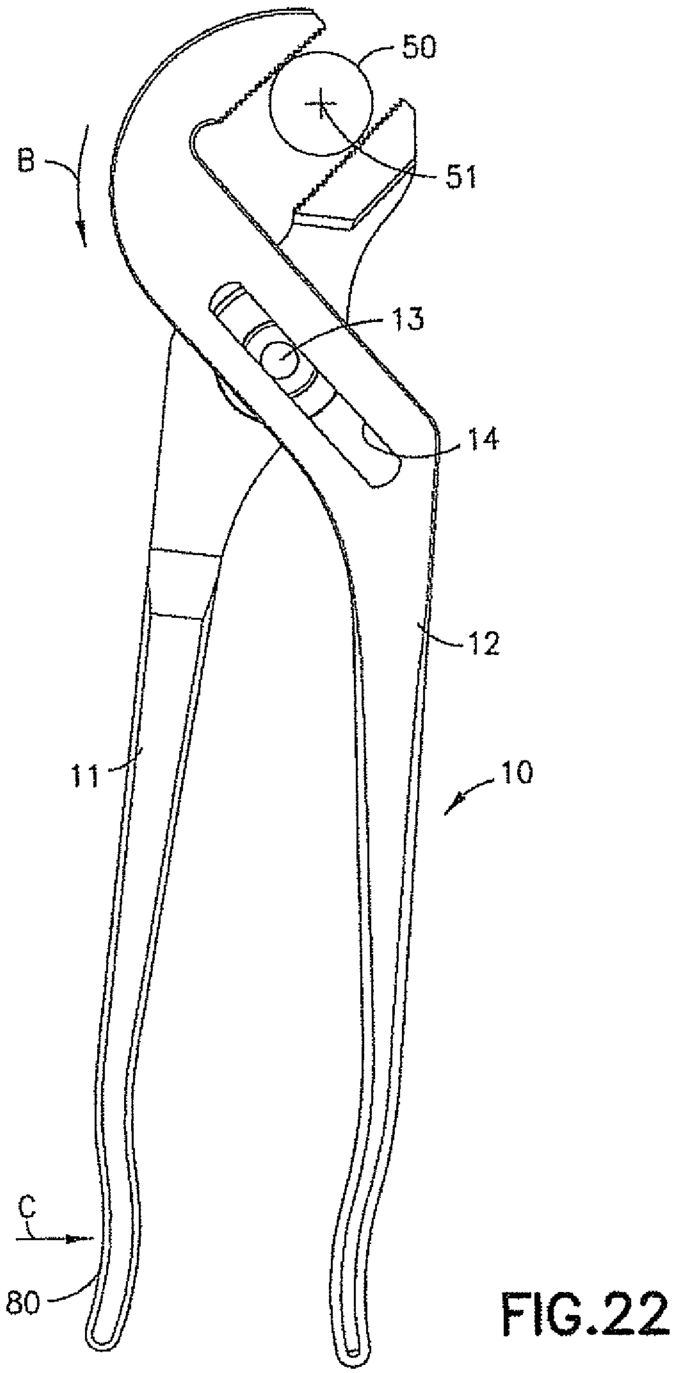
FIG. 22 is a rear elevational view of the pliers as shown in FIG. 20.

Jaws 20 and 25 are contactingly engaged at points 26 and 27 in the fully closed or inoperable disposition (FIGS. 1-4) Jaws 20 and 25 are in parallel disposition in the operably positions (FIGS. 20-22). Jaws 20 and 25 have opposed respective faces 30 and 35. Referring specifically to FIGS. 5-16, there is shown the details of jaw faces 30 and 35. Faces 30 and 35 each include a rectangular portion of length L and W width as shown in FIGS. 8 and 14. Faces 30 and 35 have the angularly disposed cross-teeth 38 and 39 formed thereon. Faces 30 and 35 are cross-cut so that pyramidal teeth 40 are formed in angularly disposed rows 41 and 42. The angular disposition of the teeth as measured across the apices of the teeth is 130° as shown as angle A in FIGS. 8 and 14. The rows are specifically spaced so that there are no more than about 10 rows teeth/in. along the length L of the rectangular portion.

Referring specifically to FIGS. 20-22, there is shown pliers 10 operably grippingly engaged on seized or overly-tightened cylindrical steel bar 50 having axis 51. Handles 18 and 23 are gripped in the conventional manner. When gripped and rotated clockwise with respect to bar axis 51, as shown by arrow B (FIG. 20), a substantial torque grip slip force is developed to un-seize or loosen bar 50.

It has surprisingly been found that a relatively compact pliers of no more than about 10 to 12 inches in overall length as measured from 46 to 47 (FIGS. 17 and 18), with a moment arm of no more than about 5 to 6 inches, as measured from the pivot axis, and having the afore-described specific cross-teeth configuration and construction provides a torque grip slip force 200 to over 300% greater than similarly sized prior art pliers.

It is well-known in the art related to gripping tape undergoing sidewards and twisting forces, to provide fine cross-teeth to hold the tape and avoid damage to the gripped surfaces. Such fine cross-teeth jaw construction fish tape gripping pliers are disclosed in U.S. Pat. Nos. 7,395,740 and 7,415,913 to Reckhart, the named inventor in the present application.

The fish tape pliers art as exemplified in U.S. Pat. Nos. 7,395,740 and 7,415,913, required a fine or narrow airway of teeth of about 17 to 32 teeth/in, to provide sufficient non-slip grip under twisting and cross-wise forces in fish tape operations. It was surprisingly found with respect to the present invention that 130° angular array of no more than about 10 pyramidal teeth/in. provides an exceptionally high torque grip slip force.

EXAMPLES

A series of resultant torque force tests were undertaken. The test apparatus included a ¾ inch steel bar held in a vise at one end, and a torque meter encompassed bar adjacent the vise. The pliers undergoing the test were contactingly engaged at the midpoint of the steel bar, and an elastic member encompassed the pliers handles to hold the pliers in place in gripping engagement with the steel bar. An SAB force applicator/meter applies a downward force on handle grip point, as shown by arrow C at recess 80 on the pliers 10 (FIGS. 20 and 22). All tools under test had similar handle configurations.

The tools undergoing the test were a Channellock 430 model (the "430" pliers) in an industry standard 10-inch tongue and groove pliers with a 5.5 movement arm and standard parallel rows of teeth. A Channellock 430 pliers was cross-cut to form the pyramidal teeth configuration of the present invention as afore-described and shown in the FIGS. (the "430X" pliers) as afore-descried and shown in the FIGS. A Channellock 440 model is an industry standard 12 inch tongue and groove pliers with a 6.5 movement arm and standard parallel rows of teeth (the "440" pliers). A Channellock 440 pliers blank was cross-cut to form the pyramidal teeth configuration (the "440X" pliers) as afore-described and shown in the FIGS. A Channellock 432 V-shaped opposed jaws 10-inch torque and groove plies with a 5.5 movement arm with standard parallel rows of teeth (the "432" pliers) also underwent the test.

A 45 lb. force was applied to the handle of each of the foregoing pliers and the resultant torque grip slip force was measured. The results are shown in Table I.

TABLE I

| PLIERS | APPLIED FORCE | RESULTANT TORQUE GRIP SLIP FORCE |
|---|---|---|
| 430 | 45 lb. | 110 lb |
| 430X | 45 lb. | 220 lb. |
| 440 | 45 lb. | 120 lb. |
| 440X | 48 lb. | 300 lb. |
| 432 | 45 lb. | 85 lb. |

The pliers of the present invention, viz. the 430X and 440X pliers, provide a 200 to 300% improvement in the slip grip torque force over the standard pliers in the industry, and more than about 300% improvement over the angled or V-shaped opposed jaws pliers of comparable size and handle configuration.

Although the invention has been afore-described in relation to its preferred embodiment, it is to be understood that many other modifications and variations can be made without departing from the scope of the present invention. It is therefore, intended that the appended claims cover such modifications and variations within the scope of the invention.

What is claimed is:

1. A compact slip joint pliers that develops a high resultant applied force on a seized cylindrical workpiece and provides a high slip force to prevent slip of the jaws from the gripped cylindrical workpiece, comprising:

a front member comprising a proximately disposed handle and a distally disposed jaw having a face;

a rear member comprising a proximately disposed handle and a distally disposed jaw having a face;

a tongue and groove construction comprising a slot disposed in one of the handles, and a pivot pin slidably operably disposed in the slot for opening and closing the jaws and the jaw faces being in parallel disposition for receiving a cylindrical workpiece;

said handles comprising no more than 10 to 12 inches in overall length including a moment arm of no more than 5 to 6 in. as measured from the pivotal axis;

said jaw faces each include a rectangular portion of a long length and short width comprising angularly disposed rows of pyramidal teeth having a diamond shaped four-sided base and a point apex; wherein said diamond shaped base includes a short axis parallel to the face length portion and long axis parallel to the face width portion;

each one of said pyramidal teeth having said diamond shaped four-sided base and said point apex having equal size as all other pyramidal teeth along each of said jaw faces;

each said long axis of each respective said diamond shaped four-sided base is longer than said short axis of each respective said diamond shaped four-sided base;

wherein the angular disposition of teeth as measured across the apices of teeth is 130°;

wherein each said row of pyramidal teeth comprises 10 teeth/inch measured along the length of the jaw; and wherein with a grip load force of 45 lb. exerted on the moment arm, a resultant applied force of 200 lb to 300 lb is developed on a gripped cylindrical workpiece; which is a 200-300% improvement over a V-shaped opposed jaws pliers of comparable size and handle configuration.

2. A method for loosening a seized cylindrical workpiece with a compact slip joint pliers that develops a high resultant applied force on a seized cylindrical workpiece and provides a high slip force to prevent slip of the jaws from the gripped cylindrical workpiece comprising slip joint pliers, said method comprises the steps of:

(a) opening the pliers manually, said pliers comprises;

a front member comprising a proximately disposed handle and a distally disposed jaw having a face;

a rear member comprising a proximately disposed handle and a distally disposed jaw having a face;

a tongue and groove construction comprising a slot disposed in one of the handles, and a pivot pin slidably operably disposed in the slot for opening and closing the jaws and the jaw faces being in parallel disposition for receiving a cylindrical workpiece;

said handles comprising no more than 10 to 12 inches in overall length including a moment arm of no more than 5 to 6 in. as measured from the pivotal axis;

said faces each include a rectangular portion of a long length and short width comprising angularly disposed rows of pyramidal teeth having a diamond shaped four-sided base and a point apex; wherein said diamond shaped base includes a short axis parallel to the face length portion and long axis parallel to the face width portion;

each one of said pyramidal teeth having said diamond shaped four-sided base and said point apex having equal size as all other pyramidal teeth along each of said jaw faces;

each said long axis of each respective said diamond shaped four-sided base is longer than said short axis of each respective said diamond shaped four-sided base;

wherein the angular disposition of teeth as measured across the apices of teeth is 130°; and wherein each said row of pyramidal teeth comprises 10 teeth/inch measured along the length of the jaw;

(b) closing the pliers on and grippingly engaging a seized cylindrical workpiece at a resultant force of 200-300 lb. with the pliers jaws pyramidal teeth;

(c) providing a high slip force so as to prevent slipping of the jaws from the gripped seized cylindrical workpiece; and (d) moving the pliers circumferentially and applying the resultant force of 200-300 lb. without slip to loosen the seized cylindrical workpiece, which is a 200-300% improvement over a V-shaped opposed jaws pliers of comparable size and handle configuration.

* * * * *